US005671454A

United States Patent [19]
Rowden

[11] Patent Number: 5,671,454
[45] Date of Patent: Sep. 23, 1997

[54] HEAD TO FILM INTERFACE FOR PHOTOFINISHING EQUIPMENT

[75] Inventor: David L. Rowden, Rochester, N.Y.

[73] Assignee: Eastman Kodak Company, Rochester, N.Y.

[21] Appl. No.: 736,095

[22] Filed: Oct. 24, 1996

[51] Int. Cl.⁶ .............................. G03B 17/24; G03B 5/48
[52] U.S. Cl. .......................... 396/320; 396/319; 355/40; 355/77; 360/104
[58] Field of Search ............................. 396/319, 320, 396/612; 355/40, 77; 360/3, 104, 105, 109

[56] References Cited

U.S. PATENT DOCUMENTS

| | | | |
|---|---|---|---|
| 3,662,937 | 5/1972 | Borman | 226/89 |
| 4,199,796 | 4/1980 | Videc | 360/130.22 |
| 5,016,030 | 5/1991 | Dwyer et al. | 354/21 |
| 5,041,933 | 8/1991 | DeMarti, Jr. et al. | 360/104 |
| 5,260,844 | 11/1993 | Koga et al. | 360/96.3 |
| 5,307,100 | 4/1994 | Kubo | 354/105 |
| 5,519,464 | 5/1996 | Brock et al. | 396/319 |
| 5,541,685 | 7/1996 | Jessop | 354/106 |
| 5,568,212 | 10/1996 | Shimizu | 396/320 |
| 5,598,310 | 1/1997 | Rowden et al. | 360/130.32 |
| 5,600,384 | 2/1997 | Merle et al. | 396/319 |

*Primary Examiner*—A. A. Mathews
*Attorney, Agent, or Firm*—Thomas H. Close

[57] ABSTRACT

A head to film interface for photofinishing equipment, includes: a pair of spaced apart film guides for establishing a film plane; a pair of magnetic heads located between the film guides above the film plane at the edges of the film; and a pair of compliant edge rollers extending into the film plane for urging the edges of the film into contact with the magnetic heads, the compliant edge rollers being mounted for independent rotation.

11 Claims, 2 Drawing Sheets

HEAD TO FILM INTERFACE FOR PHOTOFINISHING EQUIPMENT

CROSS-REFERENCE TO RELATED APPLICATIONS

The present application is related to U.S. applications Ser. Nos. 08/430,671, filed Apr. 28, 1995, by Merle et al., and entitled, "Self Aligning Magnetic Media Follower Device", now U.S. Pat. No. 5,600,384, and 08/431,182, filed Apr. 28, 1995, by Rowden et at., and entitled "Magnetic Head to Media Backer Assembly", now U.S. Pat. No. 5,598,310.

FIELD OF THE INVENTION

The invention relates generally to the field of photography, and in particular to photofinishing. More specifically, the invention relates to a magnetic head-to-film interface in photofinishing equipment.

BACKGROUND OF THE INVENTION

Photographic film strips having a virtually transparent magnetic film layer on the non emulsion side have recently been introduced to the market as a part of the Advanced Photographic System (APS). APS cameras include magnetic recording heads that record digital information in longitudinal tracks along the edges of the film strip. Photofinishing equipment reads this recorded data and adjusts the photofinishing conditions in response thereto. Reading the information from the magnetic film layer is complicated by the relatively low magnetic density of the magnetic layer. Photographic film is of much greater thickness than the tape conventionally used in magnetic recording. The film is neither compliant nor inherently flat and exhibits a relatively high stiffness and observable cross curvature across its width that is convex on the non emulsion side of the film. Experiments with compliant roller transport mechanisms that urge the film into the magnetic heads for reading the data from the edges of the film in photo finishing equipment have shown that the transport mechanism tends to impart a steering motion to the film and causes the film to pull out from under one or the other of the magnetic heads.

There is a need therefore for an improved head to film interface in photofinishing equipment.

SUMMARY OF THE INVENTION

The present invention is directed to overcoming one or more of the problems set forth above. Briefly summarized, according to one aspect of the present invention, a head to film interface for photofinishing equipment, includes: a pair of spaced apart film guides for establishing a film plane; a pair of magnetic heads located between the film guides above the film plane at the edges of the film; and a pair of coaxial, compliant edge rollers extending into the film plane for urging the edges of the film into contact with the magnetic heads, the compliant edge rollers being mounted for independent rotation.)

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages: roller steering of the filmstrip due to misaligned heads is eliminated; the rollers are effective to reduce film curl; and the independently mounted edge rollers stop turning when a splice narrower than the film strip enters the rollers, thereby reducing wear and the accumulation of dirt on the heads.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
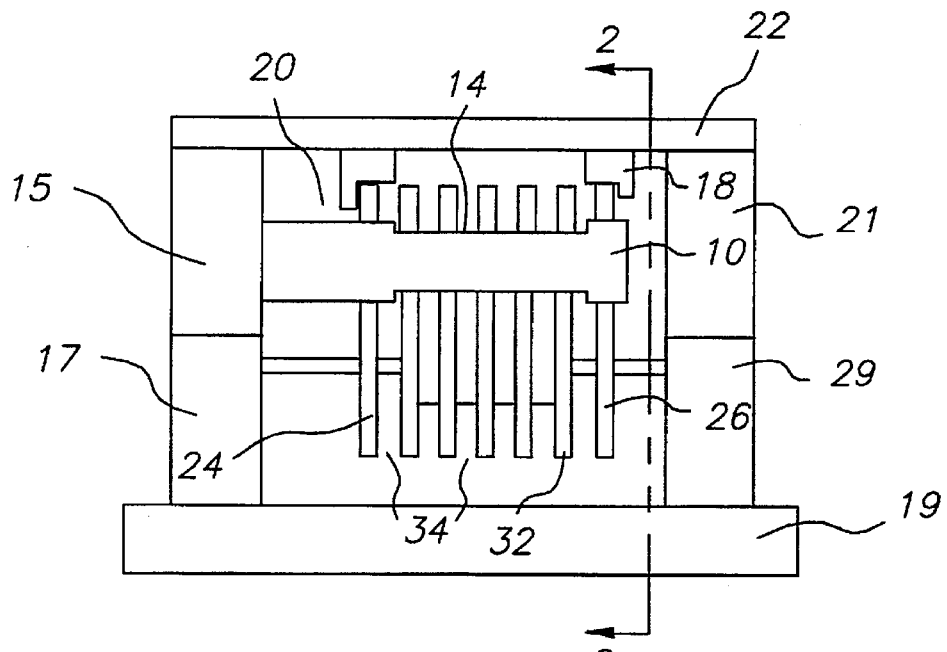
FIG. 1 is a side view of the head to film interface according to the present invention.
Figure 2:
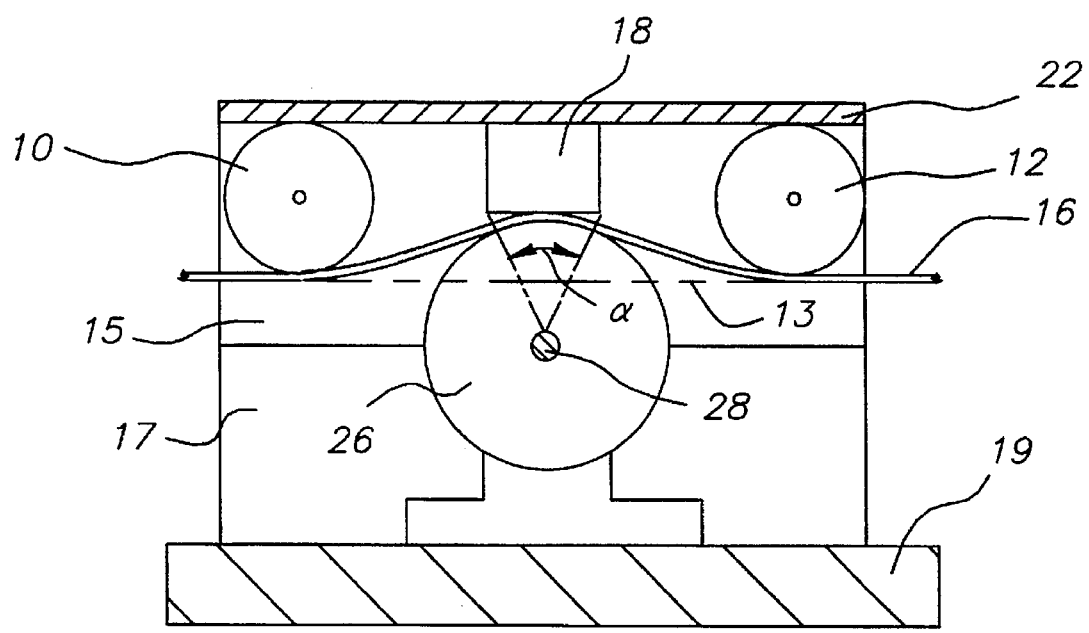
FIG. 2 is a cross sectional view of the head to film interface taken along line 2—2 in FIG. 1.

Referring to FIGS. 1 and 2, the magnetic head to film interface according to the present invention includes a pair of spaced apart fill guides 10 and 12, which define a film plane (shown by phantom line 13 in FIG. 2) that is tangent to the bottom of the film guides. The film guides 10 and 12 are mounted on a left support that is split into a top left support plate 15 and a bottom left support plate 17, which in turn is mounted on a mech plate 19. The film guides 10 and 12 are relieved in a central region 14 (as shown in FIG. 2) so that the image area of the film 16 is not abraded passing under the guides. The fill guides 10 and 12 may be mounted for rotation in an axially compliant manner, or may be fixed as shown in the drawing. A fixed film guide is by nature axially compliant, since the film slides on the guide and can easily slide from side to side.

A pair of magnetic heads 18 and 20 are mounted on a head support plate 22 between the film guides above the film plane 13 at the edges of the film 16. Plate 22 is mounted across top support plate 15 and a precision spacer plate 21. The magnetic heads are generally reproduce heads, but may be write heads for certain applications. In the preferred embodiment, the heads 18 and 20 are mounted on head support plate 22 by a self aligning film edge follower device as shown in U.S. patent application Ser. No. 08/430,671, now U.S. Pat. No. 5,600,384. A pair of disc shaped compliant edge rollers 24 and 26 are mounted on a shaft 28 for independent rotation about the shaft. One end of the shaft 28 is received in a bearing in bottom left support plate 17, and the other end of the shaft is received in a bearing in a bottom right support plate 29, which is mounted on mech plate 19.

The compliant edge rollers 24 and 26 extend into the film plane 13 for urging the edges of the fill 16 into contact with the magnetic heads 18 and 20 respectively. The edge rollers 24 and 26 may be-formed for example from an elastomeric material such as polyurethane or silicone based rubber. In a head to film interface for APS film, compliant polyurethane edge rollers approximately 19 mm in diameter and 3 mm thick and extending into the film plane sufficient to provide approximately 30 degree angle of wrap α were found to work satisfactorily. The compliant edge rollers were between 20 and 60 Shore A durometer hardness (preferably 40) and were mounted with respect to the magnetic heads 18 and 20 so that the heads and film penetrated the surface of the rollers by approximately 0.15 mm.

In a preferred embodiment of the invention, a compliant film support roller 32 is mounted for independent rotation on shaft 28 between the compliant edge rollers 24 and 26 to support the central region of the film between the magnetic heads 18 and 20. Preferably, the compliant film support roller 32 is a zero constraint roller, achieved by forming grooves 34 in the surface of the compliant roller. Other known zero constraint roller designs could also be employed. The compliant film support roller may be formed from the same material as the edge rollers 24 and 26.

Figure 3:
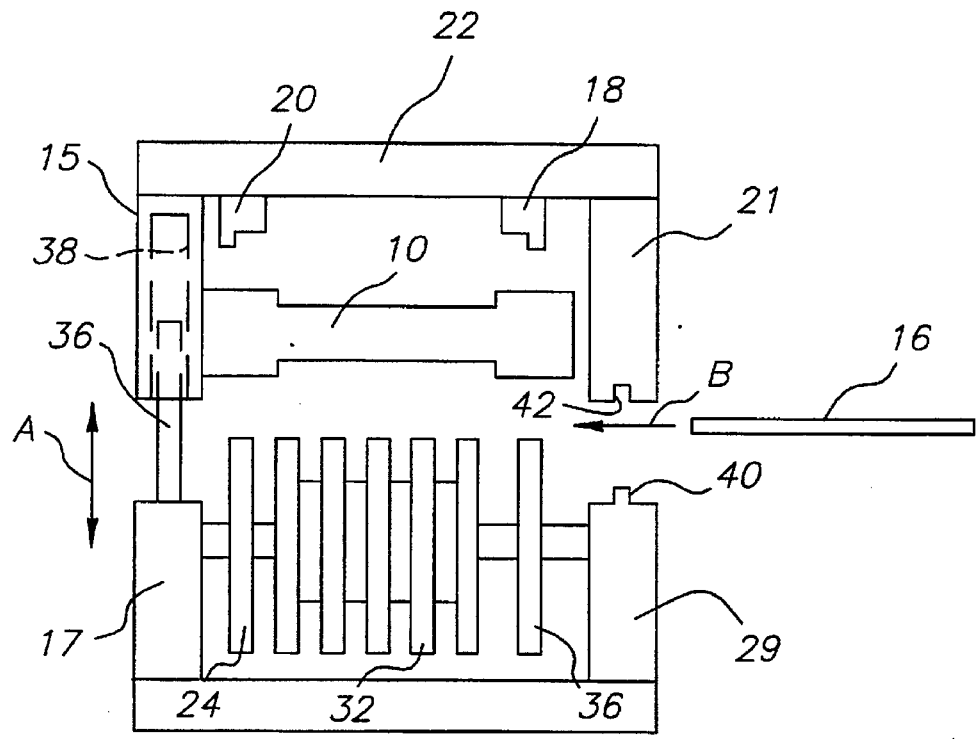
FIG. 3 is a side view of the head to film interface, showing how film is loaded into the interface.

Referring to FIG. 3, support plates 15 and 17 are mounted, for example by a shaft 36 in a linear bearing 38 so that the lower support plate 17 and the compliant rollers 24, 26 and 32 may be lowered in the direction of arrow A below the film plane 13 to allow film 16 to be introduced in the direction of arrow B into the head film interface. Bottom right support plate 29 and precision spacer 21 may be provided with an alignment pin 40 and receiver 42 (or other precision alignment means) to insure alignment between the heads and rollers when the interface is closed on film 16.

Figure 4:
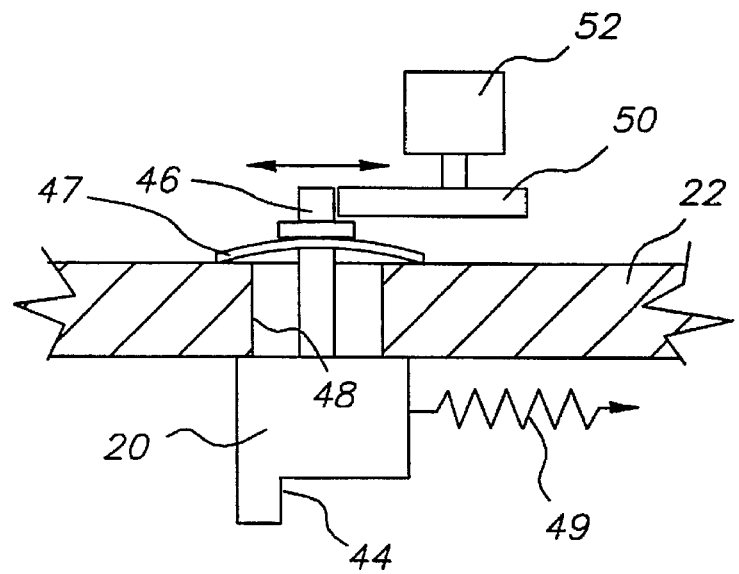
FIG. 4 is a partial broken away view of the magnetic head mounting arrangement of the present invention.

As shown in FIG. 4, the magnetic heads (only head 20 is shown for example) are mounted on head support plate 22 for lateral movement. The head 20 defines an edge follower feature 44 that is adapted to be urged into the edge of the film to accurately locate the head with respect to the magnetic information on the film. The head 20 is mounted by a pin 46 in a slot 48 and is held in the slot by a bearing and disc-spring washer arrangement 47. The heads are urged together by a spring 49. When the compliant edge rollers 24 and 26, and the film support roller 32 are lowered as shown in FIG. 3 to load film, the heads are moved apart, for example by a cam 50 and rotary solenoid 52 so that the edge followers 44 on the magnetic heads will clear the edges of the film. When the compliant edge rollers 24 and 26, and film support roller 32 have been moved back up into contact with the magnetic heads and film, the rotary solenoid 52 rotates cam 50 to release the heads, which are urged into contact with the edges of the film by spring 49.

The invention has been described with reference to a preferred embodiment. However, it will be appreciated/hat variations and modifications can be effected by a person of ordinary skill in the art without departing from the scope of the invention.

PARTS LIST
10 film guide
12 film guide
13 film plane
14 relieved central region of film guide
15 top left support plate
16 film
17 bottom left support plate
18 magnetic head
19 mech plate
20 magnetic head
21 precision spacer plate
22 head support plate
24 compliant edge roller
26 compliant edge roller
28 shaft
29 bottom right support plate
32 compliant film support roller
34 grooves in roller 32
36 shaft
38 linear bearing
40 alignment pin
42 receiver for alignment pin 40
44 edge follower feature on magnetic head 20
46 pin
47 disc spring washer
48 slot
49 spring
50 cam
52 rotary solenoid

I claim:

1. A head to film interface for photofinishing equipment, comprising:

a) pair of spaced apart film guides for establishing a film plane;

b) a pair of magnetic heads located between the film guides above the film plane at the edges of the film;

c) a pair of compliant edge rollers extending into the film plane for urging the edges of the film into contact with the magnetic heads, the compliant edge rollers being mounted for independent rotation.

2. The head to film interface claimed in claim 1, further comprising: a compliant film support roller mounted between the compliant edge rollers for independent rotation.

3. The head to film interface claimed in claim 2, wherein the compliant film support roller is a zero constraint roller.

4. The head to film interface claimed in 3, wherein the film support roller and the edge rollers are polyurethane.

5. The head to film interface claimed in 3, wherein the film support roller and the edge rollers are silicone rubber.

6. The head to film interface claimed in claim 1, wherein the magnetic heads define a film edge follower and are mounted so that the film edge follower is urged into to edge of the film.

7. The head to film interface claimed in claim 2, wherein the compliant edge rollers and the film support roller are mounted for rotation on a common shaft.

8. The head to film interface claimed in claim 6, wherein the compliant edge rollers are mounted for movement way from the film guides and heads for loading film into the head to film interface.

9. The head to film interface claimed in claim 8, further comprising means for moving the heads apart when the compliant edge rollers are moved away from the film guides so that film can be loaded into the interface without damage.

10. A method for interfacing a film to a magnetic head in photofinishing equipment, comprising the steps of:

a) providing a pair of spaced apart film guides for establishing a film plane;

b) locating a pair of magnetic heads between the film guides above the film plane at the edges of the film; and c) urging the edges of the film into contact with the magnetic heads with a pair of compliant edge rollers extending into the film plane, the edge rollers being mounted for independent rotation.

11. The method claimed in claim 10, wherein the magnetic heads define film edge followers, and further comprising the steps of:

a) prior to urging the edges of the film into contact with the magnetic heads, moving the heads apart so that the film edge followers are outside the edges of the film; and b) after urging the edges of the film into contact with the magnetic heads, moving the heads together so that the film edge followers contact the respective edges of the film.

* * * * *